Dec. 27, 1932.    O. H. SELLARS    1,891,953
GUIDE FOR DRILL STEELS
Filed Sept. 5, 1930
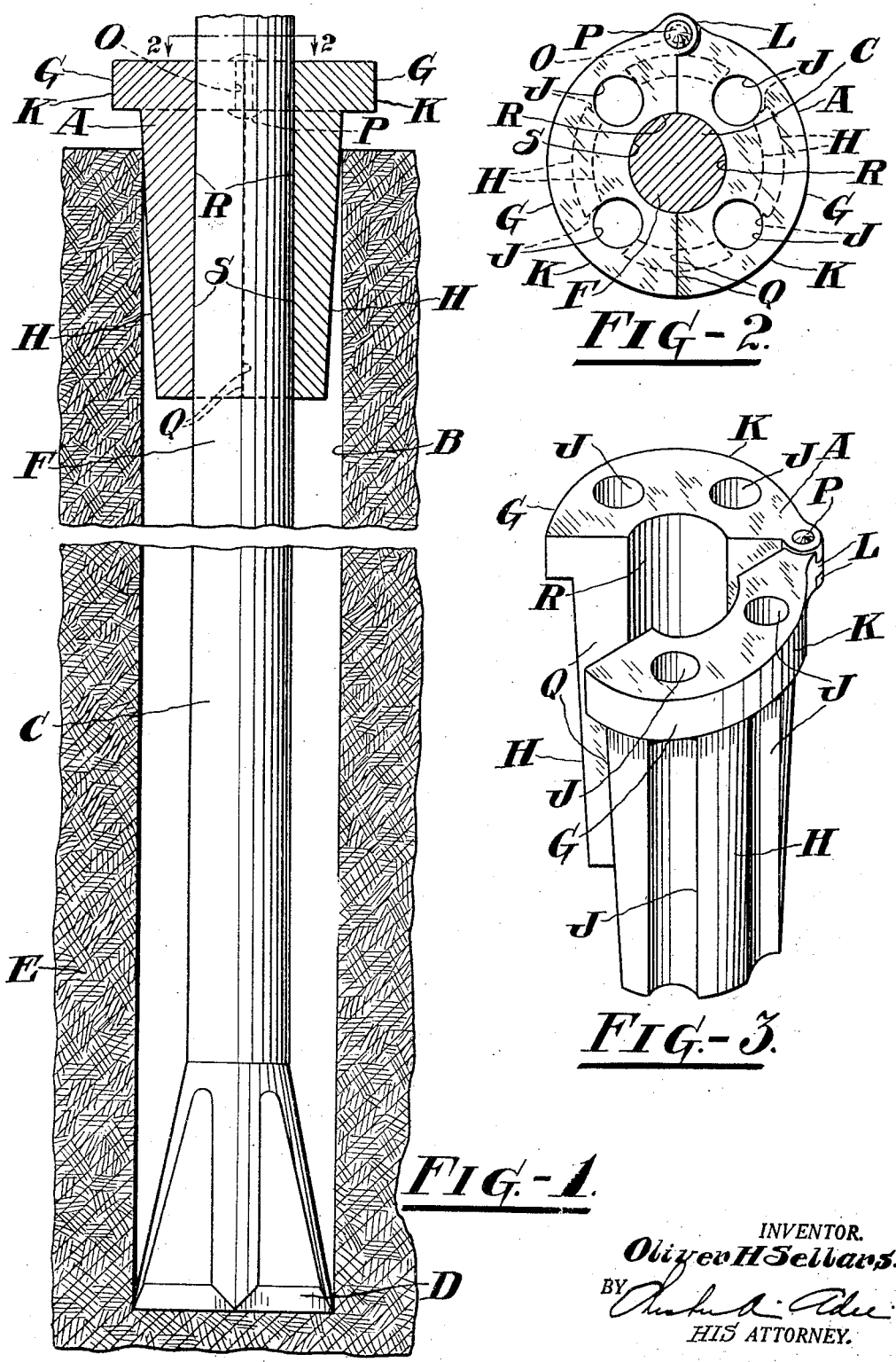
INVENTOR.
Oliver H Sellars.
BY
HIS ATTORNEY.

Patented Dec. 27, 1932

1,891,953

UNITED STATES PATENT OFFICE

OLIVER H. SELLARS, OF GLEN RIDGE, NEW JERSEY, ASSIGNOR TO INGERSOLL-RAND COMPANY, OF JERSEY CITY, NEW JERSEY, A CORPORATION OF NEW JERSEY

GUIDE FOR DRILL STEELS

Application filed September 5, 1930. Serial No. 479,881.

This invention relates to guiding devices for working implements, but more particularly to a guide adapted to be inserted in a drill hole to form a bearing for the body portion of a drill steel.

In drilling holes in rock containing abnormalities such as veins of extreme hardness or crevices and voids, it is an extremely difficult matter to maintain the cutting bit of the drill steel at all times coaxial with the drilling apparatus, and therefor, in parallelism with adjacent drill holes.

The tendency of the drill steel to deflect from the desired courses becomes more pronounced as the depth of the drill hole increases. This is particularly the case when the cutting bit encounters strata of unusual hardness or an inclined surface forming the bottom of a void or crevice in the rock.

Another factor which, to some extent, makes it extremely difficult to maintain the cutting bit coaxial with the rock drill, is that the portion of the rock drill, such as a chuck, which supports the shank end of the drill steel, is of necessity provided with a bore of somewhat larger diameter than the shank of the drill steel. Obviously this permits the drill steel to assume an inclined position with respect to the rock drill. The reason for this loose fit is that the drill steel must be capable of reciprocating freely within the chuck. Otherwise the force of the blow of the percussive element will be greatly reduced by friction between the shank and the chuck.

In view of the foregoing facts it is an object of the present invention to form a substantial bearing for the body portion of a drill steel at a point intermediate its cutting bit and the shank so that all portions of the drill hole will be in alignment with the drilling apparatus.

Other objects will be in part obvious and in part pointed out hereinafter.

In the accompanying drawing illustrating the invention and in which similar reference characters refer to similar parts, Figure 1 is a sectional elevation of the guide and illustrating a practical application thereof, Figure 2 is a top plan view taken through Figure 1 on the line 2—2 looking in the direction indicated by the arrows, and Figure 3 is a perspective view of the guide.

Referring more particularly to the drawing, the guide, which is designated generally by A, is shown inserted in the end of the drill hole B to guide a drill steel C.

The drill steel C is provided with the usual flared cutting bit D for cutting the rock E and in this instance is shown as having a cylindrical body portion F, the rear end or shank (not shown) of which may extend into a rock drill and may be provided with the usual lugs (not shown) for interlockingly engaging the rock drill.

The guide A comprises a pair of members G having tapered outer surfaces H to engage the walls of the drill hole B. The guide is of frusto-conical shape and in the outer surfaces of the members are longitudinally extending grooves or passages J through which the detritus may escape from the drill hole B.

At the ends of larger diameter of the members are lateral external flanges K having suitable tongues L in which are formed apertures O for the reception of a pin P whereby the members G are pivotally connected together.

In the inner or adjacent surfaces Q of the members are grooves R of semi-circular shape which cooperate to form a circular guideway S for the body portion F of the drill steel C.

The members G may be of substantial length so that they will form a bearing for a considerable portion of the body portion F of the drill steel, and the guideway S is preferably of only sufficiently larger diameter than the body portion F of the drill steel so as to assure a sliding fit for the body portion while at the same time preventing undue lateral movement of the drill steel relatively to the guide.

In practice, the present invention has been found to be unusually efficient for the purpose intended. Due to its coniform shape it is well adapted for use in connection with holes of different diameters while at the same time assuring the same bearing contact with the drill steel. The guide may be readily used in either vertical, horizontal or inclined holes. Furthermore, it may be readily applied to the drill steel without necessitating the removal of the drill steel from the rock drill.

I claim:

A guide adapted to be inserted into a drill hole, comprising a pair of members having outer tapered surfaces, lateral external flanges at the ends of larger diameter of the members, means extending through the flanges for pivotally connecting the members together, said members having semi-circular grooves in their inner adjacent surfaces and cooperating to form a circular guideway to slidably guide a drill steel, and passages in the flanges and the outer surfaces of the members to permit the escape of detritus from a drill hole.

In testimony whereof I have signed this specification.

OLIVER H. SELLARS.